Aug. 18, 1959 M. CAMRAS 2,900,443

MAGNETIC RECORDER AND REPRODUCER FOR VIDEO

Filed April 11, 1952 7 Sheets-Sheet 1

Inventor
Marvin Camras by Hill, Sherman, Meroni, Gross & Simpson Attys

MAGNETIC RECORDER AND REPRODUCER FOR VIDEO

Filed April 11, 1952 7 Sheets-Sheet 2

Inventor
Marvin Camras
by Hill, Sherman, Meroni, Gross & Simpson Attys

Aug. 18, 1959 M. CAMRAS 2,900,443

MAGNETIC RECORDER AND REPRODUCER FOR VIDEO

Filed April 11, 1952 7 Sheets-Sheet 3

Inventor
Marvin Camras by Hill, Sherman, Meroni, Gross & Simpson Attys

Inventor
Marvin Camras
by Hill, Sherman, Meroni, Gross & Simpson Attys

Inventor
Marvin Camras by Hill, Sherman, Meroni, Gross & Simpson Attys

MAGNETIC RECORDER AND REPRODUCER FOR VIDEO

Filed April 11, 1952

7 Sheets-Sheet 6

Inventor
Marvin Camras
by Hill, Sherman, Meroni, Gross & Simpson Attys

Inventor
Marvin Camras
by Hill, Sherman, Meroni, Gross & Simpson Attys

United States Patent Office 2,900,443

Patented Aug. 18, 1959

2,900,443

MAGNETIC RECORDER AND REPRODUCER FOR VIDEO

Marvin Camras, Chicago, Ill., assignor to Armour Research Foundation of Illinois Institute of Technology, Chicago, Ill., a corporation of Illinois Application April 11, 1952, Serial No. 281,939

19 Claims. (Cl. 178—6.6)

This invention relates to the magnetic recording and reproduction of video signals and particularly to the magnetic recording and reproduction of video signals generated by moving visual images.

The recording head of the present invention is particularly adapted for recording video signals, such as television signals, on a lengthy magnetizable medium. In television, at the present time, the moving scene to be transmitted is translated into electrical impulses by means of a process of scanning wherein an exploring element or spot is moved over the scene to be transmitted in periodically repeated paths covering the image area. The exploring element is so constructed that it generates a television signal which indicates the brightness of its instantaneous position. This television signal is transmitted over the communications channel to the reproducing spot whose brightness is controlled by the signal. The reproducing spot moves over the viewing screen in a path similar to, and synchronous with, that of the exploring element. Thus, the reproducing spot reconstructs at the viewing screen, both in magnitude and position, the brightness distribution of the image area. The path covering the image area and the viewing screen is commonly a series of straight parallel lines and commonly the scene is scanned at the rate of sixty interlaced pictures, or thirty complete frames per second to give the image the illusion of continuous motion.

One of the principal features and objects of the present invention is the provision of a method and means for recording and reproducing a video signal such as a television signal.

Another object of the present invention is to provide a novel method and means for translating a magnetic signal into an electrical signal.

Still another object of the present invention is to provide a novel method and means for translating an electrical signal into a magnetic signal.

A further object of the present invention is to provide a novel magnetic recorder head.

A still further object of the present invention is to provide a novel magnetic reproducer head.

Another and further object of the present invention is to provide a novel method and means for recording serially related electrical signals on a lengthy magnetizable medium.

Still another and further object of the present invention is to provide a novel magnetized lengthy magnetizable medium.

Other objects and features which I believe to be characteristic of my invention are set forth with particularity in the appended claims. My invention itself, however, both as to its organization, manner of construction, and method of operation, together with further advantages and objects thereof, may be best understood by reference to the following description taken in connection with the accompanying drawings, in which:

As shown on the drawings.

Figure 1:
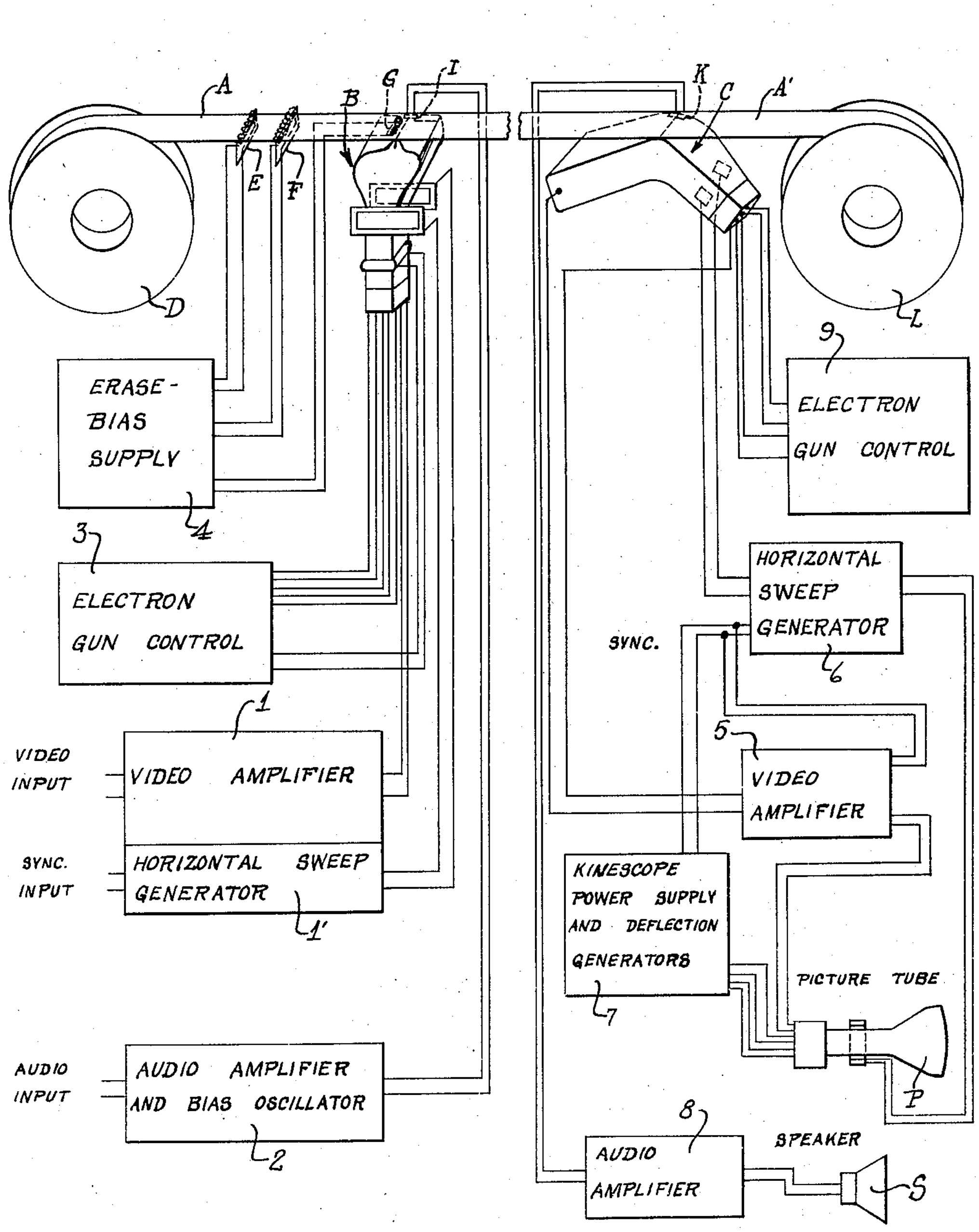
Figure 1 is a diagrammatic showing of a video recording system and a video reproducing system as they might be employed in recording and monitoring a video signal, and embodying the novel teachings and principles of the present invention.

In Figure 1 is illustrated the complete overall system of the present invention as it might be employed for example in recording a television program and contemporaneously reproducing the recording for purposes of monitoring. In such a case, the tape portions A, A′ passing respectively over a recording head B and reproducer head C could be part of the same tape. In any event, the tape portion A represents an elongated magnetizable medium which may be delivered at a substantially uniform rate from a supply reel D and may first travel over an erase head E, then possibly a polarizing head F, and thereafter may travel over bias head G and the video electromagnetic recording head B and preferably an audio electromagnetic recording head I. The tape portion A′ has a video signal and preferably an audio signal recorded thereon and is passed over the video electromagnetic reproducer or playback head C and an audio electromagnetic reproducer head K and is then wound on a take-up reel L at a substantially uniform rate. The video recorder head B is shown in detail in Figures 2 through 7 and the video reproducer head C is shown in detail in Figures 20, 21 and 22; these heads will be specifically described hereinafter. The polarizing head F might be used in conjunction with a D.C. erase head E to depolarize the tape prior to recording thereon. The bias head G would likewise be used to aid in depolarizing the tape. If a high frequency erase head were used, the bias head would produce a high frequency bias field and the polarizing head F would not be used. The bias field could be produced by the recording head B as will hereinafter be described.

As indicated in Figure 1, the video signal to be recorded may be supplied to the video amplifier 1, for example from a television receiver, or from television program lines, and the horizontal sweep generator 1′ may receive a synchronizing signal from the same source. The audio input may be supplied from the discriminator stage of a receiver or from audio lines to the audio amplifier 2 for the audio recording head I. A bias oscillator 2 may supply the bias field to the head I instead of using a separate bias head. The electron gun control 3 is represented as supplying the recording tube filament, plate, and beam supply voltages as well as control voltages for focus, positioning, intensity and the like, while erase-bias supply 4 furnishes erasing, polarizing and bias voltages.

In the playback system, the video signal detected by reproducer head C is delivered to the video amplifier 5 and the amplified signal controls a conventional television picture tube P, for example. The video amplifier may be provided with a conventional D.C. restorer circuit if desired. The output from the video amplifier 5 may be used to synchronize the horizontal sweep generator 6 for the reproducer head C and the deflection generators of the kinescope supply 7 for the picture tube P, or in some cases, as for example if the video signal is being transmitted, a master sync. generator can be used to synchronize the sweep generator 6 and deflection generators of the picture tube. The audio signal on the tape A′ is detected by the audio reproducer head K and transmitted through audio amplifier 8 to the speaker S. The electron gun supply 9 is indicated as furnishing filament, plate and beam supply voltages for the playback tube C as well as control voltages for focus, positioning and the like.

Figures 2, 3, 4:
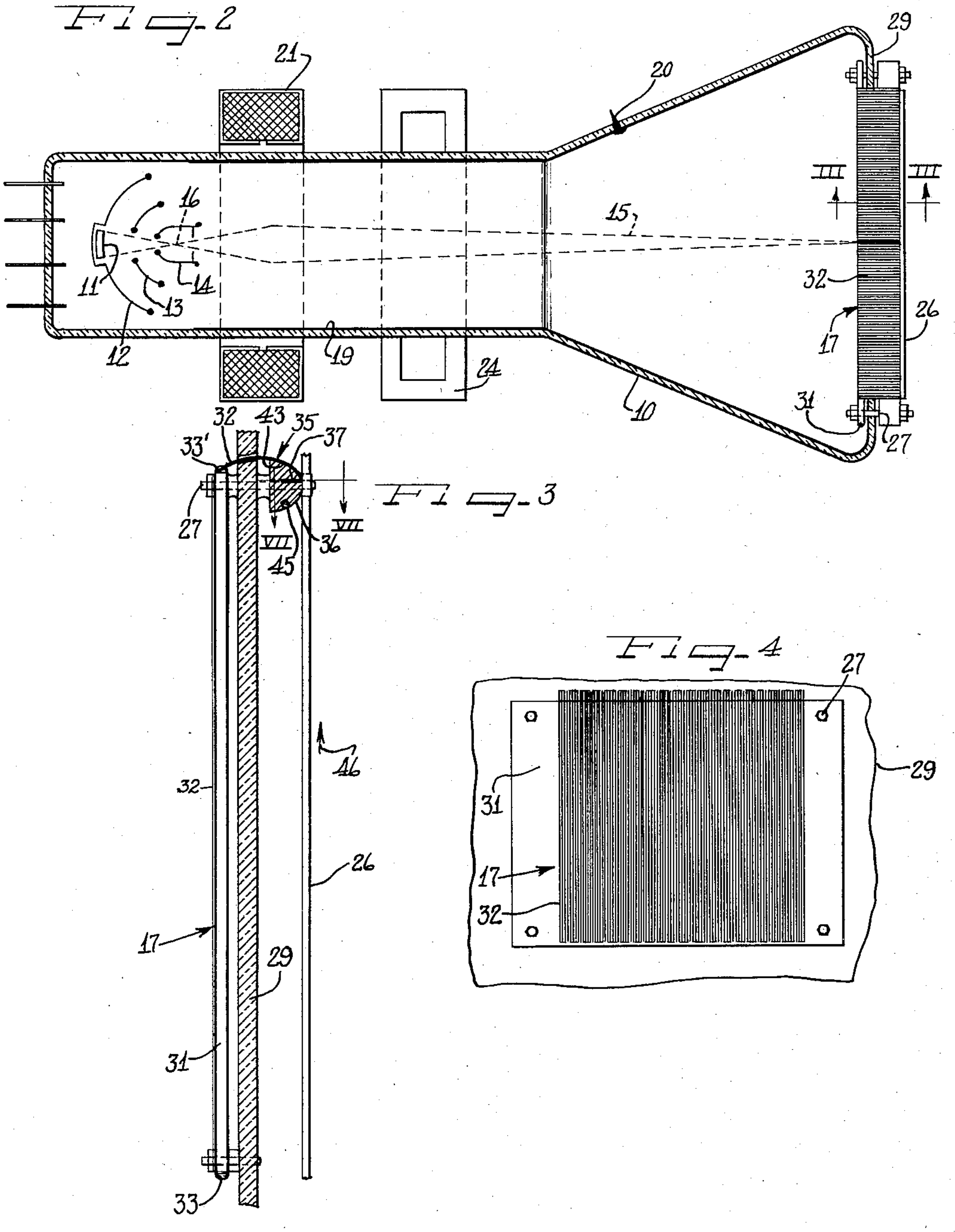
Figure 2 is a diagrammatic horizontal sectional view of an electro-magnetic recorder head embodying the novel teachings and principles of the present invention.
Figure 3 is a fragmentary vertical sectional view, taken generally along the line III—III of Figure 2.
Figure 4 is a fragmentary front elevational view looking at the target electrode from the left in Figure 2.
Figures 5, 6, 7, 8, 9:
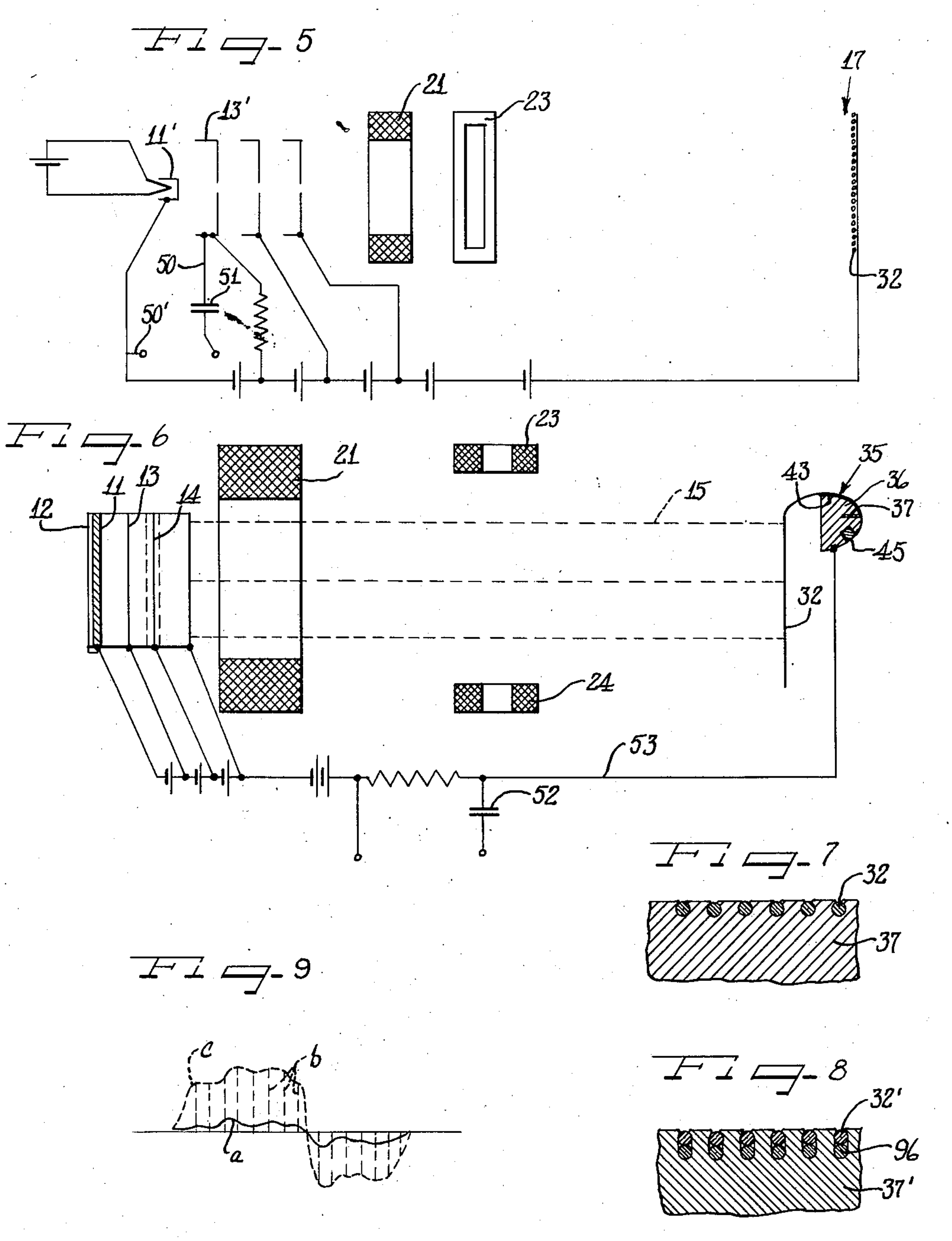
Figure 5 is a diagrammatic plan view of the electromagnetic recorder head of Figure 2 showing the video signal applied to the first electrode for intensity modulation of the electron beam and showing the focus coil in section.
Figure 6 is a diagrammatic side elevational view of the recorder head of Figure 5, but showing the video signal applied to the target electrode pick-up wires and showing the electrodes and coils of Figure 2 in vertical section.
Figure 7 is a fragmentary horizontal sectional view taken substantially along the line VII—VII of Figure 3.
Figure 8 is a fragmentary horizontal sectional view similar to Figure 7, but showing neutralizing windings in addition to the target wires in the core grooves.
Figure 9 is a diagrammatic illustration of a pulse signal such as may be substituted for a continuously varying video signal.

A preferred embodiment of the electromagnetic recording head of the present invention is illustrated in Figures 2 and 7 of the drawings and includes a cathode ray tube 10 having a long curved vertically extending cathode 11, and electrodes 12, 13 and 14 for establishing and controlling an electron beam 15 having considerable vertical extent as indicated in Figure 6. Such a beam will be termed a wide beam, wide referring to the vertical extent of the beam in the orientation of the tube illustrated. As indicated at 16 in Figure 2, the beam from the cathode 11 converges between the focusing electrodes 14 and diverges thereafter. For focusing the beam 15 on the target electrode 17 at the other end of the tube, a focusing electrode is deposited on the wall of the tube as indicated at 19 with an electrical connection thereto through the wall at 20. Alternatively or in addition, a focus coil 21 is provided. Two separate focus coils may be used if desired. It will be understood by those skilled in the art that the focus coil 21 will have the tendency to incline the vertical extent of the beams at a slight angle to the vertical. Thus the focus coil 21 may be utilized to compensate for slightly inclined pick-up wires on the target electrode 17. Thus, two independent focus methods, e.g., electrostatic by means of electrode 19 and magnetic by means of coil 21, may be used simultaneously to provide good focus and azimuth adjustment of the beam.

Horizontal deflector means 23 and 24 are provided for deflecting the stream of electrons cyclically to provide a scanning beam sweeping across the target electrode 17. For a television signal, for example, the horizontal scanning beam may be synchronized to move in step with the horizontal sweep of the television pick-up device generating the signal. The target electrode may be of length substantially equal to the width of the lengthy magnetizable medium 26 upon which the video signal is to be recorded and may be mounted by means of pins 27 embedded in the end wall 29 of the tube, as shown in Figures 2, 3 and 4.

Referring to Figures 3 and 4, it will be seen that the target electrode 17 comprises a rectangular plate 31 having a large number of wires 32 extending generally vertically in closely spaced relation along the inner face of the plate. If, for example, the target plate 31 is approximately equal in length to the width of the tape 26, the plate may carry approximately 500 pick-up wires, which wires lead to a transducer device 35 over which the tape passes. This number will give a resolution which is approximately equal to the best present video standard. It is suggested, however, that a target having a greater length than the width of the tape may be used with the target wires run in converging fashion to the transducer device having a length equal to the width of the tape. Such an arrangement would permit better resolution, higher current, less critical mechanical design, and the like.

As seen in Figure 3, the pick-up wires are secured at the bottom of the target plate 31 as by means of a glass rod 33. An additional insulating support 33′ may be provided at the top. The wires extend through the end wall 29 of the tube to the transducer device 35 for converting electron flow in the pick-up wires into concentrated magnetic fields. The wires may be of tungsten to permit a good seal in a glass tube.

As seen in Figure 3, the device 35 includes a housing 36 having in a recess therein a thin strip or lamination 37 of high permeability material, which may, for example, have a thickness of about one mil. The lamination preferably has a plurality of grooves therein as indicated in Figure 7 through which the pick-up wires extend so that the record member can ride on the outer edge surface of the lamination. The housing 36 may be made of non-magnetic conducting material, such as copper, and the upper portion of the housing may be insulated from the wires by means of the insulation material 43 and the wires may be secured in a slot in the lower portion of the housing as by means of a copper wedge 45. The non-magnetic material of the housing has the function of confining the magnetic fields generated in the lamination by electron flow in the pick-up wires to a very narrow region.

The magnetic record member 26 may move in the direction indicated by the arrow 46 in Figure 3, and thus pass transversely through the magnetizing regions set up by electron flow in the pick-up wires. The tape is thus magnetized across its width as successive target wires are energized by the scanning beam 15, it being understood that the wires are maintained at a positive potential by means of a voltage applied to the lower portion of the housing 36. For the case of a television signal, a line of magnetization across the magnetic record member would correspond to a line of varying light intensity across the scene being televised.

In order to impress the video signal on the magnetic record member, the scanning beam 15 may be modulated in accordance with the video signal to be recorded as indicated in Figure 5, or the potential at the pick-up wires 32 may be modulated in accordance with the video signal, as indicated in Figure 6. In Figure 5, conductors 50 and 50' supply a video signal between an electrode 13' and cathode 11' through condenser 51 to control beam intensity. In Figure 6, the signal is introduced on the pick-up wires through the condenser 52, conductor 53, and the lower portion of housing 36. Various accelerating and focusing voltages are applied to the various components of the tube as indicated diagrammatically in Figures 1, 5 and 6.

If a tube, as in Figure 2, carries a high D.C. component, recording may be effected on a D.C. saturated tape, with the video flux produced by the recorder head bringing down the magnetization to a value which varies about a neutral condition. Or, as indicated in Figure 8, another set of wires 96 may be wound in the transducer device lamination 37' to neutralize the D.C. component introduced by the grid wires 32', and these wires 96 or other wires, such as bias head G in Figure 1, may be excited to provide high-frequency bias.

As indicated in Figure 9, instead of recording a continuous video signal such as indicated at *a*, a pulse type video signal may be recorded having high magnitude and short duration pulses *b* whose envelope *c* follows the video signal *a*. As indicated, the pulses could then have a magnitude many times greater than the instantaneous magnitude of the video signal *a* since the R.M.S. value of the pulse signal is relatively less resulting in less heating. On the other hand, magnetization is proportional to peak current so that higher magnetizing forces are generated for a given amount of heating. With a wide electron beam such as produced by the head of Figure 2, currents of the order of one ampere are obtained in the target wires, which is adequate for magnetizing conventional record tapes.

Figure 10:
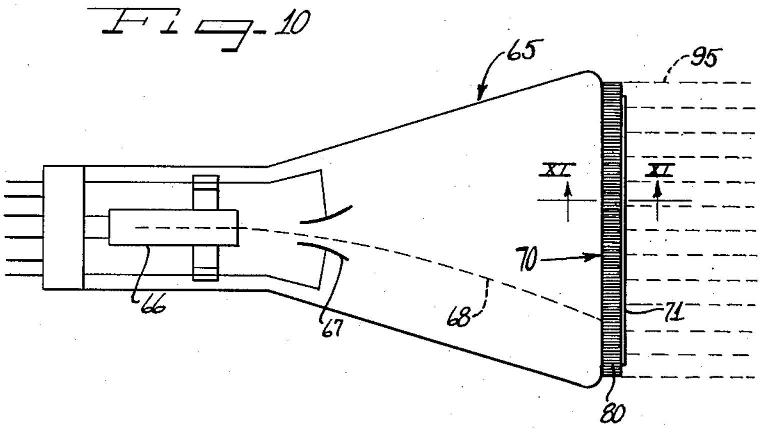
Figure 10 is a diagrammatic plan view of a modified form of electromagnetic recorder head embodying the novel teachings and principles of the present invention.
Figure 11:
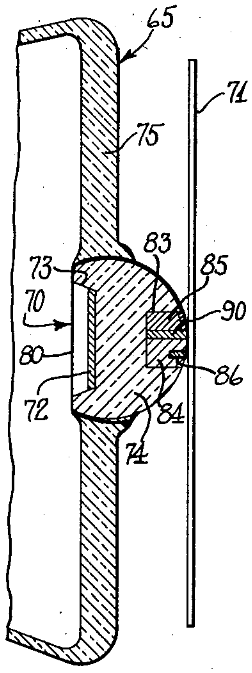
Figure 11 is a fragmentary vertical sectional view, taken generally along the line XI—XI of Figure 10.
Figure 12:
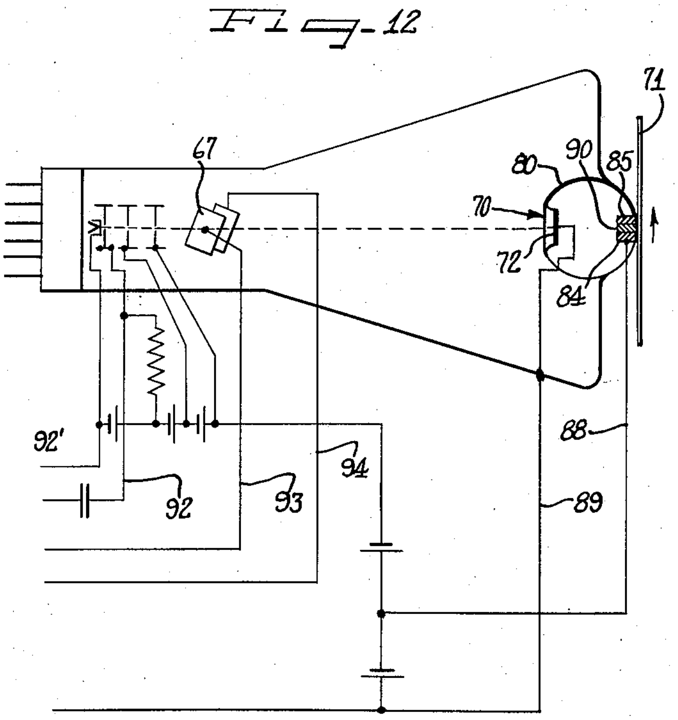
Figure 12 is a schematic side view of the head of Figure 10, showing the video signal applied to the first electrode of the tube for intensity modulation of the electron beam.

A second embodiment of the electromagnetic recording head of the present invention is illustrated in Figures 10, 11 and 12 of the drawings and includes a cathode ray tube 65 having an electron gun 66 for providing a stream of electrons. Horizontal deflector means 67 are provided for deflecting the stream of electrons cyclically to provide a scanning beam 68 sweeping across a horizontal target 70, Figure 11. Electromagnetic deflector means may be used instead of the electrostatic means shown. For a television signal, for example, the horizontal scanning means 67 may be synchronized to be in step with the horizontal sweep of the television pick-up device generating the signal. The target 70 may be of active length substantially equal to the width of the lengthy magnetizable medium 71 upon which the video signal is to be recorded and includes a collector plate 72 embedded in a recess 73 in a horizontally extending rod 74 which in turn is sealed in the end wall 75 of the tube 65. The lengthy magnetizable medium 71 may comprise a paper or plastic tape having a magnetic coating thereon. By way of example and not by way of limitation, the target 70 may be approximately two inches long and the tape may be approximately two inches wide.

In order to translate the electrical energy of the beam into magnetic energy, the rod 74 is provided with a plurality of wire loops 80 extending in spaced relation to the target plate 70 and extending through the tube wall 75 to the exterior of the tube. Exteriorly of the tube, the rod 74 is provided with a horizontal recess 83 having therein conductive, non-magnetic plates or bars 84 and 85, the bar 84 being electrically connected to each of the wires. The bar 84 has a slot along the length thereof having an end of each of the grid wires anchored therein as by means of a copper wedge 86. As indicated in Figure 12, this bar 84, which may be made of copper, may be connected to a voltage source to induce a positive voltage on the grid wires 80. If the target plate 72 is connected to a higher voltage, a potential difference will exist between the target plate and each grid wire. Thus, as the scanning beam is directed toward a particular grid wire or wires, if the wires are coated with a good secondary electron emitter and if there is a sufficient potential difference between the target plate and wire, there will be a current flow through conductor 88, copper bar 84, through the wire or wires in the region of the current flow across the gap between the wires and target plate, to the target plate 72 and thence through conductor 89. The magnetic flux set up by the current flow in each wire is concentrated into a very narrow magnetizing region by means of a thin strip or lamination 90 of high permeability material.

In a cathode ray tube having a slight amount of gas between the grid wires and target, ionization would be established by the electron beam striking the gas molecules. A local electric current would then be established from the external circuit through copper bar 84, wires 80, to the target plate 72. In this case, it will be noted that the polarity of target plate 72 with respect to the wires 80 would be the reverse of that shown in Figure 12.

In order to impress the video signal on the magnetic record member, the scanning beam may be modulated in accordance with the video signal to be recorded as indicated in Figure 12, or the potential between the grid wires and the target plate 72 may be modulated in accordance with the video signal. In Figure 12 conductors 92 and 92' supply the video signal to the electron gun to control beam intensity. The horizontal scanning signal, which may be controlled by the video signal to be recorded or otherwise synchronized with the video signal, is supplied by the conductors 93 and 94. As indicated in Figure 10, a high frequency bias field 95 may be supplied over the width of the magnetic tape by means of an external source (not shown). Alternatively, a high frequency bias may be introduced with the video signal and be superimposed on the potential difference across the grid wires-target plate gaps to provide the high frequency bias field.

If the beam 14 is intensity modulated in accordance with the video signal as in Figure 12, and ionization is used to trigger the target gaps, the equivalent of a half-tone print may be recorded, a single lop conducting for a gray tone or moderate intensity signal, and two loops simultaneously conducting for a black tone, or higher intensity signal. Thus, even in an ionizing type recorder head where conduction is of the on-off type, good video gradation can be obtained.

The grid or comb assembly may be manufactured by forming a helical groove in the rod 74 (not shown), grinding out the recesses 73 and 83, inserting the target plate 72 and the bars 84 and 85 and laminations 90 in the recesses, providing members 84, 90 and 85 with grooves registering with the rod helical groove, and winding the grid wire, which may be made of platinum, in the helical groove and corresponding grooves of the members 84, 90 and 85. The assembly may then be sealed in the end wall of the tube as indicated in Figure 11, each turn of wire being fastened to the conducting bar 84 by the wedge 86. Each turn of wire is then cut between the lower exterior of the rod and wedge 86 to provide a large number of the independent loops of wire. The target and transducer device of Figure 2 may be wound in an analogous manner.

Figure 13:
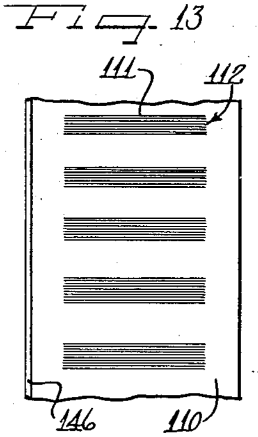
Figure 13 is a fragmentary diagrammatic plan view of a portion of a lengthy magnetizable medium magnetized in accordance with the novel teachings and principles of the present invention.

The manner in which magnetization is impressed on a tape 110 by the heads of Figures 2 and 10 is indicated diagrammatically in Figure 13. Each horizontal sweep of the scanning beam produces a transverse line 111 of magnetization on the tape. This line 111 corresponds to a line of the video signal. If the video signal comprises a moving visual image which is transmitted by scanning the image a number of times a second, a magnetic reproduction of that image will appear on the tape 110, though the image might be elongated laterally or longitudinally, and each complete scanning or frame of the moving image will have a magnetic counterpart in a frame 112 on the lengthy magnetizable medium 110. In fact, if magnetic particles were dusted on the film, an actual image corresponding to the image of the video signal would appear at each frame. The advantage of recording the video signal line for line and frame for frame in this manner is that in reproduction, the tape need not be scanned exactly line for line, but may be scanned between lines, or even longitudinally instead of transversely, that is the magnetic image need not be scanned in reproduction in the identical way in which it was reported.

In order to facilitate scanning of the recorded magnetic image, it is desirable to have adjacent lines of the magnetic image overlap. Such overlapping can be accomplished, for example, by utilizing a transducer lamination of the thickness of 0.001 inch in Figure 3, with the tape traveling at the rate of fifteen inches per second.

With double interlaced scanning, two "frames" make each picture, but the above cited advantages still hold, though not as perfectly as with a series of complete pictures. Where it is practical to do so, it is preferred to record complete rather than interlaced pictures. A record having complete pictures can be converted to the interlaced type, by offset heads, for example.

Figure 14:
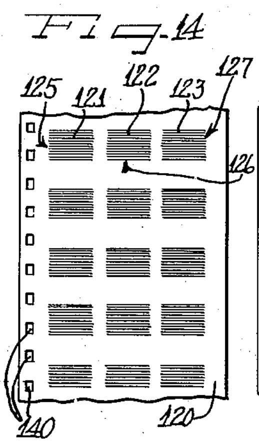
Figure 14 is a fragmentary diagrammatic showing of a lengthy magnetizable medium magnetized in a second manner.

Figure 14 illustrates a lengthy magnetizable medium 120 wherein three lines of a video signal 121, 122 and 123, for example, are located generally in the same transverse row across the tape. For the same size tape, this reduces the speed of scanning by a factor of three. Such a magnetic recording would be produced with the recording head of Figure 1, if the beam were moved across the target at one-third the scanning speed of the video signal being recorded. Each frame on the tape would then comprise three transversely aligned frame portions 125, 126 and 127. In this case, while each frame portion could be scanned separately to reproduce an image, such an image would not be so satisfactory, since only one-third of the lines originally scanned are included in the image. A record of this type has the advantage of reduced scanning rate, by a factor depending on the number of columns. A slower scanning rate is important when the system contains mechanical elements, or where inductive reactances, transit time, etc. are problems.

Figure 15:
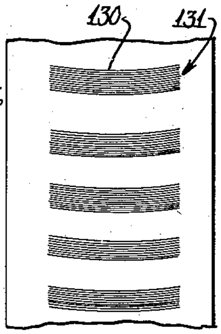
Figure 15 is a fragmentary diagrammatic plan view of a lengthy magnetizable medium magnetized in a third manner.

In Figure 15 is shown a record member similar to Figure 13 in having a single line of video signal across the width of the tape, but in which each magnetic line 130 on the tape is curved, as would be produced by the head of Figure 2 if the transducer device were curved along its longitudinal axis. The frames 131 are spaced serially along the tape as in Figure 13. An arc shaped path gives a longer line for a given tape width. This type of pattern is also an advantage when used with certain mechanical scanners.

Figure 16:
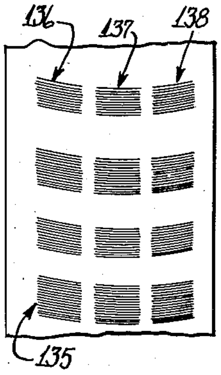
Figure 16 is a fragmentary diagrammatic plan view of a lengthy magnetizable medium magnetized in a fourth manner.

In Figure 16 each frame 135 comprises frame portions 136, 137 and 138 in an arcuate pattern across the tape.

Any one of the tapes illustrated in Figures 13 to 16 may be perforated at one edge as indicated at 140 in Figure 14 for synchronizing the speed of the tape with the video signal, or a synchronizing control may be actuated by pick-up from the magnetic frame pattern recorded on the tape; the control signals being amplified and used to correct for phase errors of the tape with respect to the pick-up head. An audio sound track may run along an edge of the tapes as indicated in Figure 13 at 146.

Figure 17:
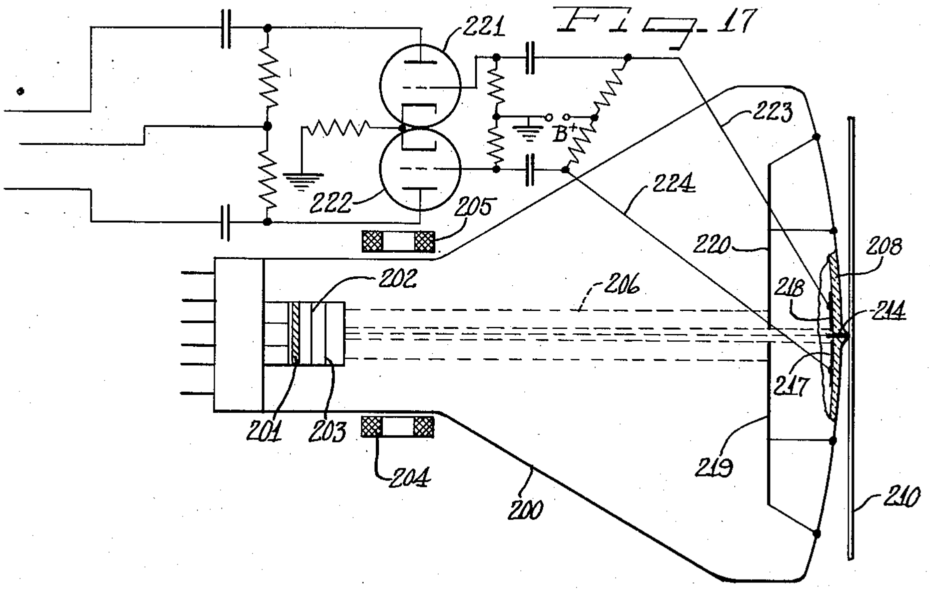
Figure 17 is a diagrammatic side view of an electromagnetic reproducer head embodying the novel teachings and principles of the present invention, and indicating an electric circuit for detecting the video signal produced by the head.
Figure 18:
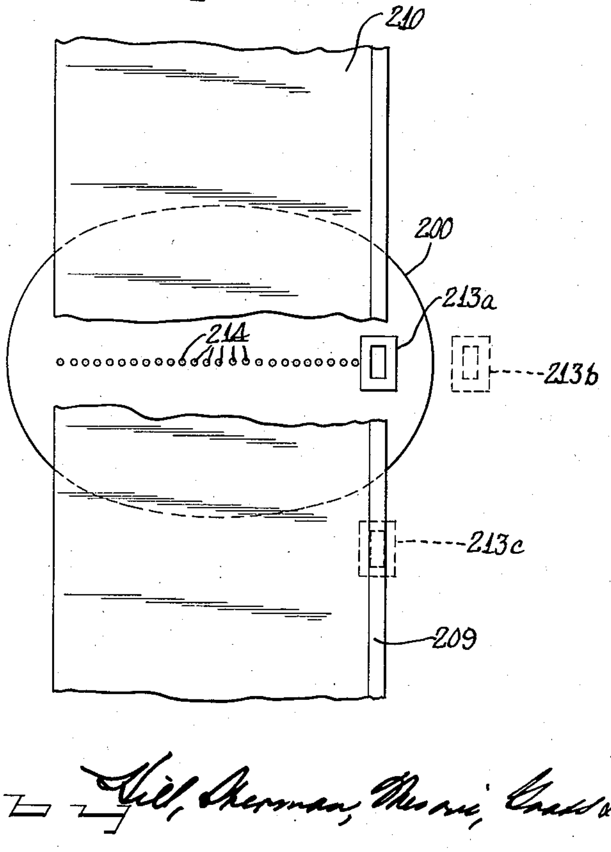
Figure 18 is an elevational view of the reproducer head of Figure 17 looking from the right in Figure 17 and with a portion of the lengthy magnetizable medium broken away.
Figure 19:
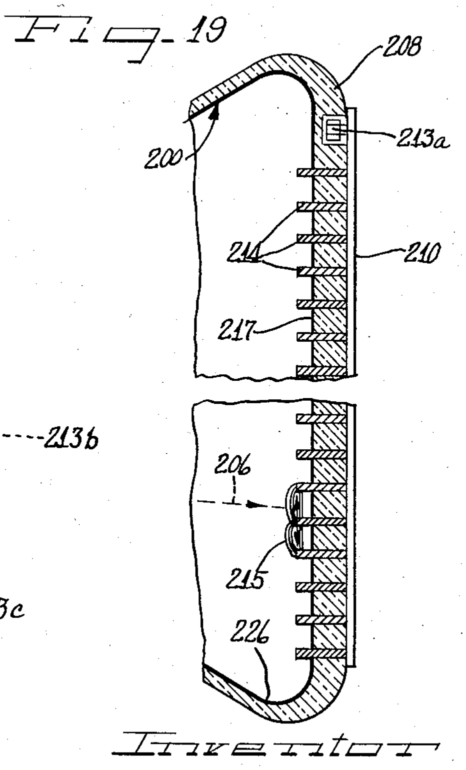
Figure 19 is a fragmentary horizontal sectional view of the reproducer head of Figure 17.

In Figures 17, 18 and 19 is illustrated an electromagnetic reproducer head according to the present invention. The head comprises a cathode ray tube 200 provided with a wide beam electrode assembly such as indicated in Figures 2 and 6 including an electron emitter 201 and accelerating and focusing electrodes such as 202 and 203. Horizontal deflection coils 204 and 205 are illustrated for sweeping the electron beam 206 back and forth across the tube end wall 208. A magnetic tape 210 having a video signal recorded on the magnetizable coating thereof is moved across the exterior of the end wall. The tape may also have an audio signal indicated at 209 recorded at one edge thereof for reproduction by a conventional head. A similar sound track is indicated at 146 in Figure 13. As indicated in Figures 18 and 19, the head is preferably disposed within the tube end wall 208 as indicated in solid outline at 213*a*, or it may be located to one side at 213*b*. It may also be located in advance of the head at 213*c*. With the audio head in line with the video head as shown in 213*a* or 213*b*, a record tape is made which can readily be edited because picture and sound correspond.

The magnetic signal recorded on the tape is utilized to deflect the wide electron beam 206. To this end a large number of high permeability wires 214 are embedded in the end wall 208 of the tube. These wires are indicated diagrammatically only in Figures 17 and 19. There may be for example, 500 of them in a two inch tube wall, and they made be made of 4750 alloy, which has the same coefficient of expansion as glass and thus makes possible a good seal. As the tape passes the exterior ends of the wires, magnetic fields are set up through the wires which may extend as indicated at 215 in Figure 19. It will be observed that the fields extend generally in a horizontal plane between adjacent wires and generally at right angles to the beam. Thus the beam will be deflected either upwardly or downwardly depending on the polarity of the fields. Collector plates 217 and 218 are located above and below the wires to collect the deflected electrons. The baffle plates 219 and 220 accurately control the width of the electron beam reaching the region of the collector plates regardless of small variations that usually occur in cathode ray tubes and the magnetic fields 215 alter the proportion of the electrons traveling to each of the collector plates 217 and 218.

As indicated in Figure 17, the output from collector plates 217 and 218 may be delivered to the grids of a pair of tubes 221 and 222 of a push-pull amplifier by means of conductors 223 and 224. The video output from the push-pull amplifier may be delivered to a video amplifier for further amplification. The elements at the face of the tube, and coatings on the sides of the tube indicated at 226 in Figure 19, are charged positively with respect to the electron gun, for focusing and acceleration. A low voltage beam is preferred because it allows greater sensitivity to deflection by the magnetic elements. Only one of the collector elements 219 or 220 may be used with a single ended video amplifier.

Figure 20:
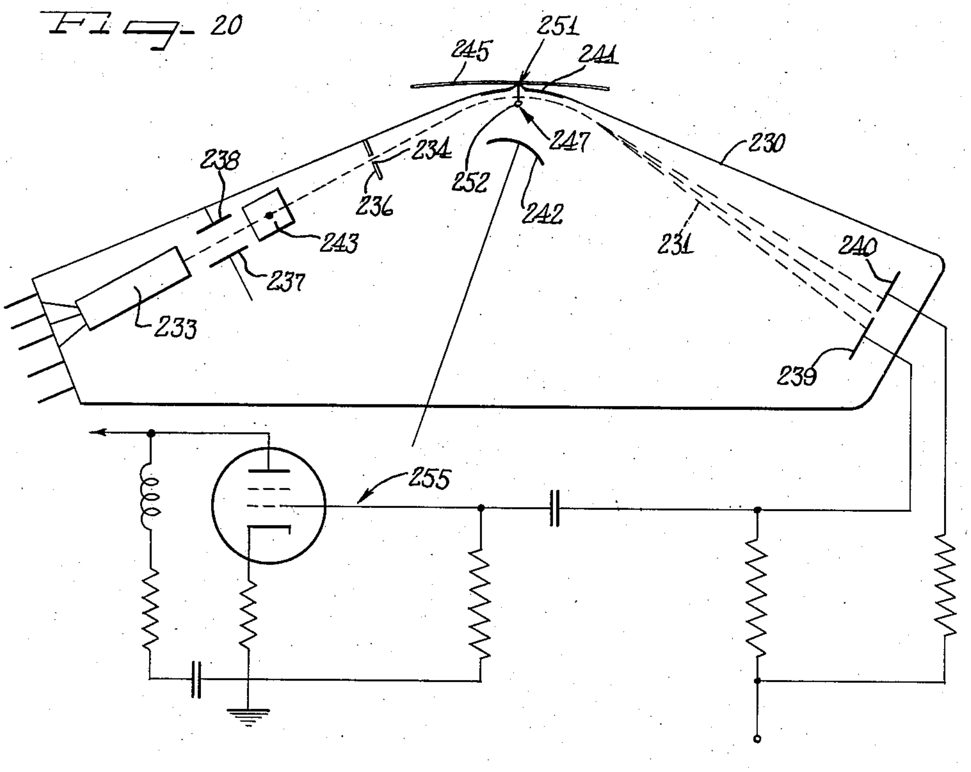
Figure 20 is a diagrammatic elevational view of a further form of electromagnetic reproducer head embodying the novel teachings and principles of the present invention.
Figure 22:
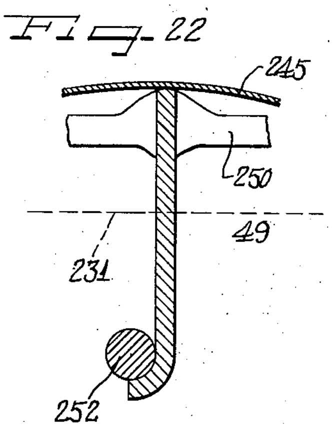
Figure 22 is a fragmentary cross-sectional view taken substantially along the line XXII—XXII of Figure 21.
Figure 21:
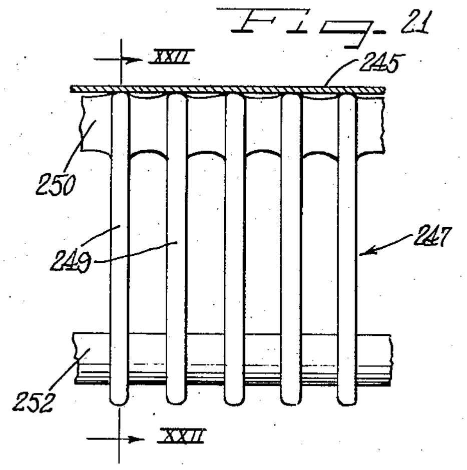
Figure 21 is a fragmentary front elevational view of the magnetic grid wire assembly of the head of Figure 20.

In Figures 20, 21 and 22 is illustrated a second embodiment of the electromagnetic reproducer head of the present invention. This head comprises a tube 230 providing a curved path for an electron beam 231. The beam is generated by an electron gun 233 and may be directed through an elongated slit 234 in a baffle plate 236 by means of vertical positioning plates 237 and 238 or by other suitable means. The beam is illustrated as being deflected downwardly to the target plates 239, 240 by means of electrostatic deflecting plates 241, 242, however magnetic deflection means could be used advantageously. The horizontal sweep plates 243 cause the beam to cyclically travel across the length of the target plates 239, 240 which act similarly to target plates 217 and 218 in Figure 17. The reproducer head of Figure 20 differs from that of Figure 17 in that the magnetic field of the record medium 245 is applied to the beam at a point remote from the target plates so that the effect of the field on the beam is amplified; that is, greater displacement of the beam at the target plates is obtained for a given applied magnetic field.

The magnetic field of the tape 245 is applied to the beam by means of a magnetic grid 247 extending across the path of the beam 231. As shown in Figures 21 and 22, this grid comprises a plurality of vertically extending members 249 of high permeability material which protrude through the tube wall 250 at the elbow 251 therein, Figure 20. The wires are sealed in the tube wall at the top and may project above the tube wall slightly as indicated in Figures 21 and 22 to receive the tape thereacross. The wires may be connected by a metallic nonmagnetic support bar 252 at their lower ends and electrical connection may be made to the cross bar 252 to maintain it at a desired potential relative to the beam. As indicated in Figure 22, the beam passes between adjacent magnetic grid wires 249 and is deflected downwardly to a greater or lesser extent depending on the strength of the magnetic field between the pair of grid wires 249 through which the beam is momentarily passing. The beam may tend to spread somewhat as the target plates are approached, the proportion of the electrons reaching each plate depending on the signal on the tape 245. It will be apparent that one target plate could be utilized which would receive varying amounts of electrons depending on the magnetic signal on the tape. A single ended output amplifier 255 may receive the signal from the target plates.

Figures 23, 24, 25:
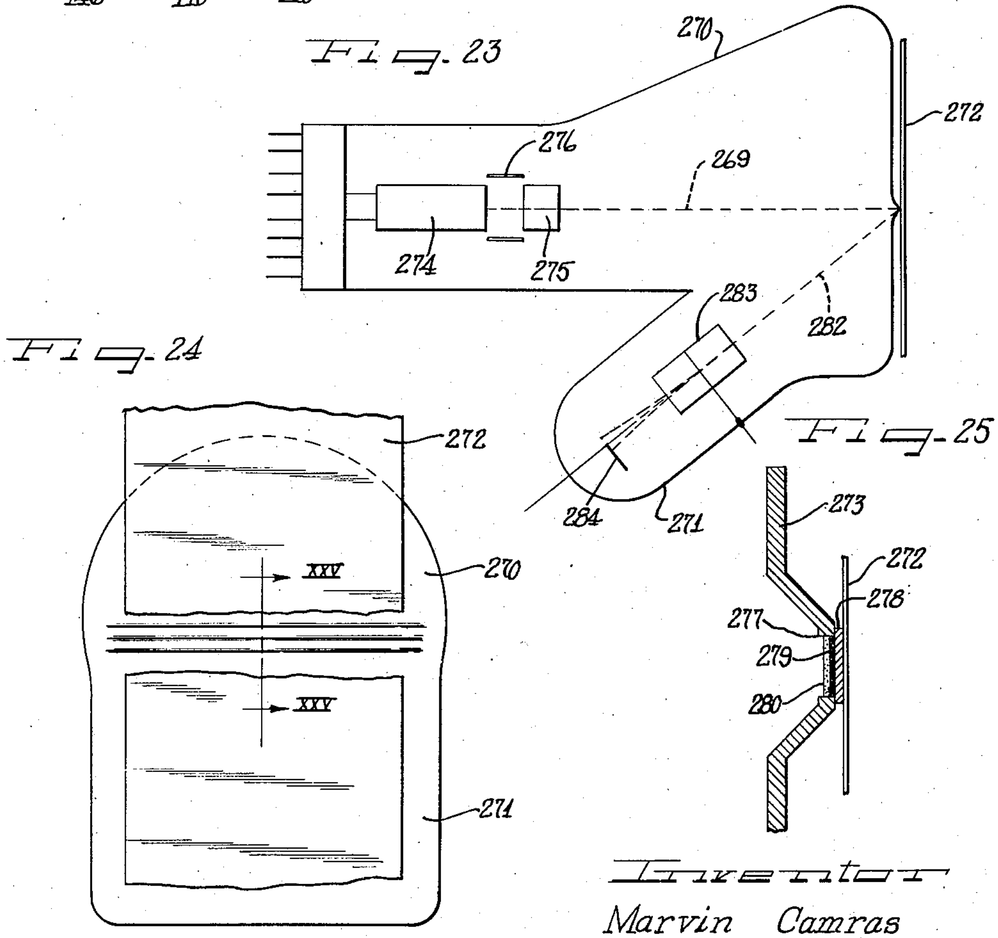
Figure 23 is a diagrammatic elevational view of a still further form of electromagnetic reproducer head embodying the novel teachings and principles of the present invention.
Figure 24 is an elevational view of the reproducer head of Figure 23 looking from the right in Figure 23 and with a portion of the lengthy magnetizable medium broken away.
Figure 25 is a fragmentary enlarged vertical sectional view taken substantially along the lines XXV—XXV of Figure 24.

In Figures 23, 24 and 25, a further form of electromagnetic reproducer head according to the present invention is illustrated. The head comprises a cathode ray tube 270 having a branch tube 271 for collecting secondary emission electrons. The tape 272 having a magnetizable portion with a video signal recorded thereon is passed across the end of the tube in a manner similar to that in recording. An electron gun 274 supplies a stream of electrons 269 which is swept back and forth across the end wall of the tube by means of horizontal deflectors 275. Vertical adjustment of the beam is afforded by vertical deflectors 276 which may be used to initially adjust the beam vertically to impinge upon a slit or window 277, shown greatly enlarged in Figure 25, in the end wall 273 of the tube. Baffle plates and a wide beam may be used to keep the beam accurately on the slit surface, or alternatively automatic control of the deflection voltages may be used. The slit is preferably closed by means of an elongated horizontally extending strip 278 of non-magnetic conductive material, such as beryllium copper having a base layer 279 of silver oxide and a coating 280 of caesium deposited thereon. Since beryllium alone is a good secondary emitter, the other materials are not necessary in all cases. The slit is preferably very narrow in order to give good resolution and the strip 278 very thin.

The reproduction is accomplished by moving the magnetized tape 272 across the exterior surface of the strip 278 so that the magnetic field of successive transverse portions of the magnetized tape extends into the interior of the tube to influence the secondary stream of electrons 282 emitted progressively across the coating 280 of the strip 278 as the scanning beam 269 sweeps across the strip. An accelerating and focusing electrode 283 directs the stream 282 to the video output collector 284, the electrode 283 preferably being shaped to give a linear gradient along the length of the collector 284 corresponding to gradient established along the length of the strip 278 by the magnetized tape. Video collector 284 may also be made to operate like elements 217 and 218 in Figure 17, but on the secondary instead of primary electron stream. Instead of the target 284, an electron multiplier may be provided to give an amplified video output. Thus the unmodulated scanning beam 269 regulates the timing of the horizontal scanning stream 282 and the magnetized tape 272 operates to modulate the stream in accordance with the video signal recorded on the tape. The target plate 284 may operate on a principle analagous to the plates 239 and 240 in Figure 20 and a single ended amplifier such as there shown may be utilized to amplify the output from the plate 284.

There is thus provided according to the present invention a method of recording an electrical signal which comprises establishing a stream of electrons, cyclically deflecting said stream of electrons to provide a scanning beam, establishing a plurality of electric circuits spaced along the path of said scanning beam for successive energization by said scanning beam to set up successive magnetic fields, controlling the intensity of said magnetic fields in accordance with the electrical signal to be recorded, and passing a lengthy magnetizable medium through said successive magnetic fields to record the electrical signals thereon.

There is further provided in accordance with the present invention the method of reproducing an electrical signal recorded magnetically on a lengthy magnetizable medium, which comprises establishing a stream of electrons scanning successive portions of an elongated region and passing a lengthy magnetizable medium having an electrical signal recorded thereon adjacent said stream of electrons to alter the scanning stream of electrons in accordance with the magnetic record on the magnetizable medium.

It will be understood that modifications and variations may be effected without departing from the scope of the novel concepts of the present invention.

I claim as my invention:

1. A signal translating system comprising a tube having a series of conductors extending through a wall thereof, means in said tube for establishing a current flow along each of said conductors in succession, a record medium disposed in close proximity to each of said conductors at the exterior of said tube in comparison with the cross-sectional dimensions of said conductors, and means including said conductors for recording fields of a nature capable of directly stimulating electric current flow on the record medium in accordance with a signal to be recorded.

2. A signal translating system comprising a tube having a series of conductors extending through a wall thereof, means in said tube for establishing a current flow along each of said conductors in succession, a record medium disposed in proximity to each of said conductors at the exterior of said tube, the spacing between said conductors and the record medium being small in comparison to the cross sectional dimensions of the conductors, means including said conductors for recording fields on the record medium, and said fields being capable of producing a corresponding electric current when coupled to an electrical conductor.

3. In combination, means for recording an electrical signal comprising a row of pole pieces disposed transversely across the path of a magnetic record medium, each pole piece having a pair of transversely opposite edges defining non-magnetic gaps with edges of adjacent pole pieces, means for cyclically producing magnetic fields in each of said gaps in succession in accordance with successive values of said electrical signal, means for moving a magnetic record medium longitudinally across said row of pole pieces in coupled relation to said gaps, and means whereby each gap records successive fields on said record medium within a time period corresponding to travel of said record medium a distance approximately equal to the longitudinal dimension of said pole pieces.

4. The combination of claim 3 wherein first electrical conductors extend between each pair of pole pieces for establishing respective recording fields at the gaps therebetween, and second electrical conductors extend between each pair of pole pieces for receiving a bias current.

5. The combination of claim 3 wherein electrical conductors extend between each pair of adjacent pole pieces for producing the magnetic fields at each of the respective gaps.

6. The combination of claim 5 wherein means is provided for supplying a pulse type signal to said conductors, the pulse amplitude varying in accordance with the amplitude of the electrical signal to be recorded.

7. In combination, means for recording a video signal having a line repetition rate of the order of 15,750 lines per second comprising a row of pole pieces disposed transversely across the path of a record medium and having a longitudinal dimension of the order of .001 inch, each pole piece having lateral edges defining non-magnetic gaps with lateral edges of adjacent pole pieces, means for cyclically producing recording fields at each of said gaps in succession in accordance with successive values of said video signal, and means for moving the record medium across the pole pieces in coupled relation to said gaps at a speed of the order of 15 inches per second.

8. The combination of claim 7 wherein said pole pieces extend in a straight row and have electrical conductors extending therebetween of transverse dimension approximately equal to the distance between successive gaps.

9. An electromagnetic recording head comprising a source of electrons, an elongated target having a plurality of electric circuits associated therewith, means for establishing a beam of electrons from said source to said target, means for sweeping said beam across the length of said elongated target to successively energize said electric circuit, a transducer device having incremental portions thereof energized by said electric circuits to set up magnetic fields in a magnetizing region thereof, means for moving a lengthy magnetizable medium through said magnetizing region, said electric circuits including a plurality of wires extending generally transversely of said target, and said transducer device comprising a single elongated magnetic member receiving said wires in proximity thereto, and means comprising a source of electric potential connected to each of said wires at the end of each of said wires remote from said target and beyond said single elongated magnetic member for producing current flow along each of said wires in succession and past the corresponding successive incremental portions of said single elongated magnetic member as the beam sweeps the length of said target.

10. An electromagnetic recording head comprising a source of electrons, an elongated target having a plurality of electric circuits associated therewith, means for establishing a beam of electrons from said source to said target, means for sweeping said beam across the length of said elongated target to successively energize said electric circuits, a transducer device having incremental portions thereof energized by said electric circuits to set up magnetic fields in a magnetizing region thereof, said transducer device being adapted to receive a lengthy magnetizable medium in magnetic coupling therewith, and said transducer device comprising a single elongated magnetic member extending in close proximity to a portion of each of said electric circuits, and means comprising a source of electric potential connected to each of said electric circuits at the end of each of the electric circuits remote from said target and beyond said single elongated magnetic member for producing current flow along each of said electric circuits in succession and past the corresponding successive incremental portions of said single elongated magnetic member as the beam sweeps across the length of said elongated target.

11. An electromagnetic recording head comprising a source of electrons, an elongated target, means for establishing a beam of electrons from said source to said target, means for sweeping said beam across the length of said elongated target, an elongated magnetizing region adjacent said target, a lengthy magnetizable medium extending through said magnetizing region, a plurality of electric circuits each having an ionizing gap with gaseous molecules therein, means comprising a source of electric potential connected between said target and each of said electric circuits for producing an electric potential difference between the target and each of the electric circuits, each gap being associated with an incremental length portion of said target for ionization of the gaseous molecules upon impingement of said beam on the associated incremental length portion of said target to close the electric circuit having said gap and to establish a magnetic field in an incremental length portion of said elongated magnetizing region, and means for controlling the intensity of the magnetic field in each incremental portion of the magnetizing region as it is actuated by said beam in accordance with the instantaneous value of an external signal.

12. An electromagnetic recording head comprising a source of electrons, an elongated target, means for establishing a beam of electrons from said source to said target, means for sweeping said beam across the length of said elongated target, an elongated transducer means associated with said target, a lengthy magnetizable medium extending across said transducer means, and a plurality of electric circuits each including said target and having a gap therein, and means comprising a source of electric potential connected between said target and the end of each of said electric circuits remote from said target and beyond said transducer means for establishing an electric potential difference between the target and said end of each of said electric circuits, each gap being associated with an incremental length portion of said target for current flow across said gap upon impingement of said beam on the associated incremental length portion of said target to close the electric circuit having said gap and to establish a magnetic field in an incremental length portion of said elongated transducer means.

13. An electromagnetic recording head comprising a source of electrons, an elongated target, means for establishing a beam of electrons from said source to said target, means for sweeping said beam across the length of said elongated target, an elongated transducer means associated with said target, a lengthy magnetizable medium extending across said transducer means, and a plurality of electric circuits each including said target and having a gap therein, each gap being associated with an incremental length portion of said target, means comprising a source of electric potential connected between said target and the end of each of said electric circuits remote from said target and beyond said transducer means for establishing an electric potenhtial difference between the target and said end of each of said electric circuits, and emitter elements associated with said gaps in said electric circuits for actuation by said electron beam to produce current flow across said gap upon impingement of said beam on the associated incremental length portion of said target to close the electric circuit having said gap and to establish a magnetic field in an incremental length portion of said elongated transducer means.

14. An electromagnetic recording head comprising a source of electrons, an elongated target having a plurality of electric circuits associated therewith, means for establishing a beam of electrons from said source to said target, means for sweeping said beam across the length of said elongated target to successively energize said electric circuits, a transducer device having incremental portions thereof energized by said electric circuits to set up magnetic fields in a magnetizing region thereof, said transducer device adapted to receive a lengthy magnetizable medium through the magnetizing region thereof, said electric circuits including a plurality of conducting members extending generally transversely of said target, and said transducer device comprising an elongated magnetic member receiving said conducting members in proximity thereto, said elongated magnetic member having an edge with a plurality of grooves therein receiving said conducting members, and means comprising a source of electric potential connected to each of said conducting members at the end of each of said conducting members remote from said target and beyond said elongated magnetic member for producing an electric potential difference between said target and said end of each of said conducting members.

15. An electromagnetic recording head comprising a source of electrons, an elongated target having a plurality of electric circuits associated therewith, means for establishing a beam of electrons from said source to said target, means for sweeping said beam across the length of said elongated target to successively energize said electric circuits, a transducer device having incremental portions thereof energized by said electric circuits to set up magnetic fields in a magnetizing region thereof, said transducer device having means for receiving a lengthy magnetizable medium thereacross, said electric circuits including a plurality of conducting members extending generally transversely of said target, and said transducer device comprising a single elongated magnetic member receiving said conducting members in proximity thereto, said elongated high permeability member having an edge with a plurality of grooves therein receiving said conducting members, the edge portions of said magnetic member defining the mouth of each groove overlying said conducting member therein and defining a gap therebetween of extent less than the width of said conducting member, and means comprising a source of electric potential connected to each of said conducting members at the end of each of said conducting members remote from said target and beyond said single elongated magnetic member for establishing an electric potential difference between said target and said end of each of said conducting members.

16. A transducer mechanism comprising a transducer device having an elongated magnetic core having a series of openings in an edge thereof providing a plurality of magnetic circuits with non-magnetic gaps therein, a plurality of electrical conductors each extending through one of said openings and linking with one of said magnetic circuits, electronic stepping switch means operatively associated with said conductors for sequentially connecting therewith, means for moving a lengthy magnetizable medium in close proximity to the non-magnetic gaps of said transducer device, and electric circuit means for accommodating a video signal operatively connected with said electronic stepping switch means for sequential connection by said stepping switch means with said conductors.

17. A transducer mechanism comprising a transducer device having an elongated magnetic core, said core having an elongated edge with a series of notches therein providing a plurality of magnetic circuits with non-magnetic gaps therein, a plurality of electrical conductors each extending through one of said notches and linking with one of said magnetic circuits, electronic stepping switch means operatively associated with said conductors for sequentially connecting therewith, means for moving a lengthy magnetizable medium in close proximity to the non-magnetic gaps of said transducer device, electric circuit means for conducting a video signal operatively connected with said electronic stepping switch means for sequential connection by said stepping switch means with said conductors, and video input means for receiving a video signal to be recorded, said input means being connected to said electric circuit means for sequential energization of said conductors by said signal whereby magnetic fields corresponding to the instantaneous value of said video signal are sequentially established in the non-magnetic gaps of said transducer device and impressed on said lengthy magnetizable medium.

18. An electromagnetic transducer system comprising means defining a path of travel for a magnetic record medium, an electromagnetic transducer device disposed on one side of said path and extending transversely across said path, means comprising said magnetic transducer device defining a series of loop magnetic circuits with respective non-magnetic gaps therein at said one side of said path for coupling the respective circuits with respective portions of the transverse extent of a magnetic record medium traveling along said path, said device comprising a single unitary magnetic core element of magnetic material disposed on said one side of said path and having polar portions integral therewith forming portions of the respective loop magnetic circuits, said integral polar portions each defining one side of one of said gaps to locate the respective gaps with reference to each other, electric circuit means coupled with each of said loop magnetic circuits, and means connected with said electric circuit means for activating each of said loop magnetic circuits in succession.

19. In combination in a magnetic transducer apparatus for recording a video signal having a given line frequency on an elongated magnetizable medium, means defining a path of travel for the elongated magnetizable medium, means for moving said medium along said path, means producing concentrated magnetic fields for coaction with said medium at points on the medium transversely displaced relative to the path of travel thereof and the points defining a line of magnetization on the medium, and means controlling the action of said producing means and varying a characteristic of said concentrated magnetic fields to record corresponding portions of selected lines of the same frame of the video signal in longitudinally aligned longitudinally overlapping relation on the medium to minimize the effects of tracking errors during reproduction.

References Cited in the file of this patent

UNITED STATES PATENTS

| | | |
|---|---|---|
| 2,112,527 | Harding | Mar. 29, 1938 |
| 2,245,286 | Marzoochi | June 10, 1941 |
| 2,273,793 | Ekstrand | Feb. 17, 1942 |
| 2,283,148 | Bruce | May 12, 1942 |
| 2,291,476 | Kernkamp | July 28, 1942 |
| 2,517,808 | Sziklai | Aug. 8, 1950 |
| 2,536,030 | Camras | Jan. 2, 1951 |
| 2,583,546 | Carlson | Jan. 29, 1952 |
| 2,617,705 | Coombs et al. | Nov. 11, 1952 |
| 2,643,130 | Kornei | June 23, 1953 |
| 2,648,589 | Hickman | Aug. 11, 1953 |
| 2,657,377 | Gray | Oct. 27, 1953 |
| 2,657,378 | Gray | Oct. 27, 1953 |
| 2,668,718 | Roberts | Feb. 9, 1954 |
| 2,706,752 | Dupy | Apr. 19, 1955 |
| 2,743,320 | Daniels | Apr. 24, 1956 |
| 2,785,038 | Ferber | Mar. 12, 1957 |

OTHER REFERENCES

Handbook for Electrical Engineers, 1st edition, page 993. (Copy in Division 16.)